(12) United States Patent
Morita et al.

(10) Patent No.: US 10,048,437 B2
(45) Date of Patent: Aug. 14, 2018

(54) OPTICAL FIBER AND COLORED OPTICAL FIBER

(71) Applicant: SUMITOMO ELECTRIC INDUSTRIES, LTD., Osaka-shi, Osaka (JP)

(72) Inventors: Keisei Morita, Yokohama (JP); Yoshinori Yamamoto, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/690,647

(22) Filed: Aug. 30, 2017

(65) Prior Publication Data

US 2018/0074258 A1   Mar. 15, 2018

(30) Foreign Application Priority Data

Sep. 13, 2016   (JP) .................................. 2016-178536

(51) Int. Cl.
*G02B 6/036* (2006.01)
*G02B 6/44* (2006.01)

(52) U.S. Cl.
CPC ............. *G02B 6/036* (2013.01); *G02B 6/443* (2013.01); *G02B 6/447* (2013.01)

(58) Field of Classification Search
CPC ..... G02B 6/03666; G02B 6/443; G02B 6/447
See application file for complete search history.

(56) References Cited

U.S. PATENT DOCUMENTS

| | | | |
|---|---|---|---|
| 6,404,972 B1* | 6/2002 | Pasch ................... | G02B 6/4482 385/123 |
| 2002/0003926 A1* | 1/2002 | Enomoto ........... | G02B 6/02095 385/37 |
| 2009/0263091 A1 | 10/2009 | Kumano | |
| 2017/0336558 A1* | 11/2017 | Endo ................... | G02B 6/02009 |

FOREIGN PATENT DOCUMENTS

| | | |
|---|---|---|
| JP | 2002-82250 A | 3/2002 |
| JP | 2002-148466 A | 5/2002 |
| WO | WO-2009/107260 A1 | 9/2009 |

* cited by examiner

*Primary Examiner* — Ellen Kim
(74) *Attorney, Agent, or Firm* — Drinker Biddle & Reath LLP

(57) ABSTRACT

A low attenuation optical fiber having a core doped with Ge is offered. The optical fiber consists of a glass part and a covering part formed around the glass part. The glass part is made of silica glass and includes: a Ge-doped center core region; an optical cladding layer formed around the center core region; and an optical cladding layer formed around the cladding layer. The relationship of $\Delta1 > \Delta3 \geq \Delta2$ holds, where $\Delta1$, $\Delta2$, and $\Delta3$ are the relative refractive index differences of the center core region, the cladding layer, and the cladding layer 30, respectively with respect to pure silica glass. The average outer diameter of the glass part is in the range of $125\pm0.5$ μm in the longitudinal direction, and $3\sigma$ is in the range of 0.1 μm to 0.5 μm, where $\sigma$ is the standard deviation of the outer diameter in the longitudinal direction.

5 Claims, 4 Drawing Sheets

3σ (μm) (variation in fluctuation of the outer diameter of glass part)

OPTICAL FIBER AND COLORED OPTICAL FIBER

FIELD OF THE INVENTION

The present invention relates to an optical fiber and a colored optical fiber.

BACKGROUND ART

The further reduction of transmission loss has been called for with respect to optical fibers used as an optical transmission line for long-haul communication. The known factors for attenuation of an optical fiber are absorption loss, scattering loss, loss due to structural disorder, and external loss. Particularly in the communication wavelength band (around 1.3 μm and 1.5 μm), the Rayleigh scattering loss is a main factor of attenuation. In an optical fiber made of silica glass, in order to achieve propagation due to total reflection of light, refractive indexes for a core and a cladding are appropriately designed, and the control of such refractive index is accomplished by adding dopants, such as germanium (Ge), chlorine (Cl) and fluorine (F).

JP2002-082250A discloses a low-nonlinearity single-mode optical fiber which includes a first center core layer, a second center core layer formed around the perimeter thereof, and a cladding layer formed around the perimeter of the second center core layer. This optical fiber has relationship of $n1>n2$, $n2 \leq n0$, and $n1>n0$, wherein the average refractive index of the above-mentioned layer is $n1$, $n2$, and $n0$, respectively, and the desired relative refractive index differences are acquired by doping Ge, etc. From a viewpoint of reliability for a long period of time, this optical fiber has improved characteristics: the generation of glass defect is controlled; no attenuation increase due to combination of glass defect and hydrogen is caused; and the durability under hydrogen is improved.

JP2002-148466A discloses an optical fiber in which a cladding region is formed around the perimeter of a core region. In this optical fiber, the ratio of the average viscosity of the core region to the average viscosity of the whole region consisting of the core region and the cladding region is 2.5 or less, and the Rayleigh scattering loss coefficient is 95% or less of a predetermined standard value $A_0$, where $A_0$ (dB/(km·μm$^4$))=0.85+0.29×[Ge], and [Ge] is the amount of germanium added to the core region, as expressed by % in terms of the relative refractive-index difference with respect to pure $SiO_2$.

WO2009/107260 discloses an optical fiber in which an outer core layer is formed around the perimeter of the center core region and a cladding layer is formed around the perimeter of the outer core layer. In this optical fiber, Ge is added to the center core region, fluorine is added to the outer core layer, the cladding layer being made of pure silica glass, and Δ1 is in the range of 0.30% to 0.35% while Δ2 is in the range of −0.1% to −0.04%, whereas |Δ1|/|Δ2| is in the range of 2.5 to 7.5, wherein Δ1 represents the relative refractive index difference of the center core region to the cladding layer and Δ2 represents the relative refractive index difference of the outer core layer to the cladding layer. This optical fiber is such that the bending loss, which is an external loss, is improved.

SUMMARY OF THE INVENTION

Object of the Invention

The object of the present invention is to offer an optical fiber and a colored optical fiber, in which the reduction of Rayleigh scattering loss is accomplished and low-attenuation properties are obtained.

Means for Achieving the Object

An optical fiber according to the present invention consists of a glass part and a covering part, and the glass part includes; a center core region provided along the central axis and containing Ge, and having a relative refractive index difference Δ1 with respect to pure silica glass; an optical cladding layer provided around the perimeter of the center core region, containing fluorine, and having a relative refractive index difference Δ2 with respect to the pure silica glass; and a jacket layer provided around the perimeter of the optical cladding layer and having a relative refractive index difference Δ3 with respect to the pure silica glass. These relative refractive index differences have a relationship of Δ1>Δ3≥Δ2. The average outer diameter of the glass part along the longitudinal direction is in the range of 125±0.5 μm, and when the standard deviation of the outer diameter in the longitudinal direction is defined as σ, 3σ is in the range of 0.1 μm to 0.5 μm.

In an optical fiber of the present invention, preferably the relative refractive index difference Δ1 is in the range of 0.15% to 0.35% and the relative refractive index difference Δ2 is in the range of −0.15% to 0.00%. Also, the relative refractive index difference Δ3 is preferably in the range of −0.05% to 0.05%. Furthermore, the fictive temperature of the glass part in an optical fiber of the present invention is preferably 1620° C. or less.

According to another aspect of the present invention, a colored optical fiber includes; an optical fiber of the present invention; a covering part consisting of two protective covering layers; and an identification colored layer provided around the perimeter of the covering part, whereas the outer diameter of the colored layer is 180 μm or more and 210 μm or less.

Advantageous Effect of the Invention

According to the above-mentioned embodiments, it is possible to offer low attenuation optical fibers and colored optical fibers, in which the reduction of the Rayleigh scattering loss is achieved.

DETAILED DESCRIPTION OF THE INVENTION

Hereinafter, examples of an optical fiber and a colored optical fiber according to embodiments of the present invention will be described, referring to the accompanying drawings. It should be noted that the present invention is not limited to these examples but is shown by the claims and equivalents to the claims, including all modifications within the scope of claims.

In an optical fiber which contains Ge in the core, the core exhibits compressive stress. Therefore, even if the residual stress of the core region is made smaller by adjusting viscosity differences between the core and the cladding so as to reduce the concentration of stress to the core as in the case of an optical fiber described in JP2002-148466A, it is not enough for reduction of Rayleigh scattering loss, and the effect of reducing the attenuation is small.

Figure 1:
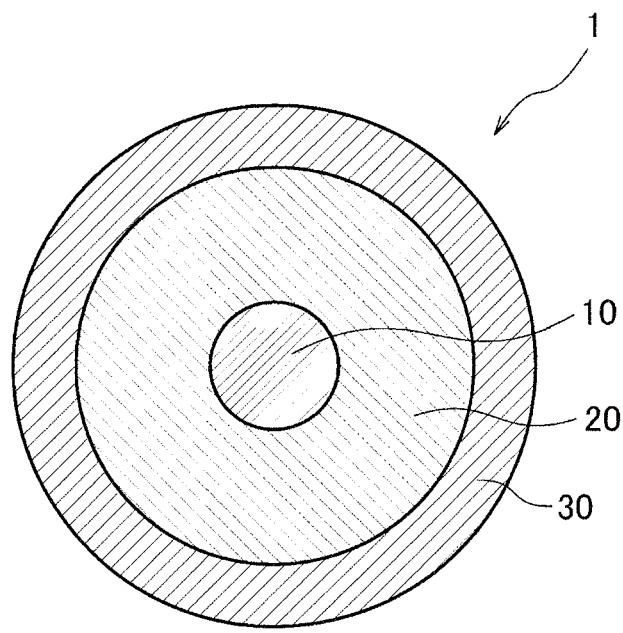
FIG. 1 is a cross-sectional view of the glass part of an optical fiber relating to an embodiment of the present invention.

FIG. 1 is a sectional view of glass part 1 of an optical fiber relating to an embodiment of the present invention. This optical fiber includes a glass part 1 and a covering part. The glass part 1, which is made of silica glass, includes a center core region 10, an optical cladding layer 20 formed around the perimeter of the center core region 10, and a jacket layer 30 formed around the perimeter of the optical cladding layer 20. A predetermined quantity of germanium as a dopant for controlling the refractive index is added to the center core region 10. The covering part is omitted in FIG. 1.

Figure 2:
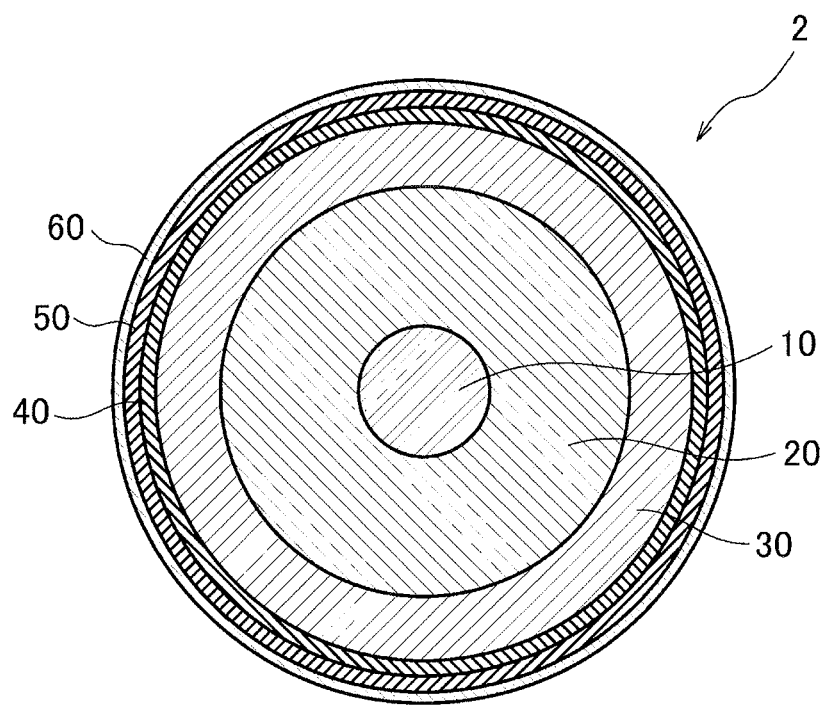
FIG. 2 is a cross-sectional view of the colored optical fiber relating to an embodiment of the present invention.

FIG. 2 is a sectional view schematically showing the cross-sectional structure of a colored optical fiber relating to an embodiment of the present invention. This colored optical fiber is formed such that a colored layer 60 for identification is provided around the perimeter of the optical fiber shown in FIG. 1. The covering part of the optical fiber consists of two protective covering layers 40 and 50.

Figure 3:
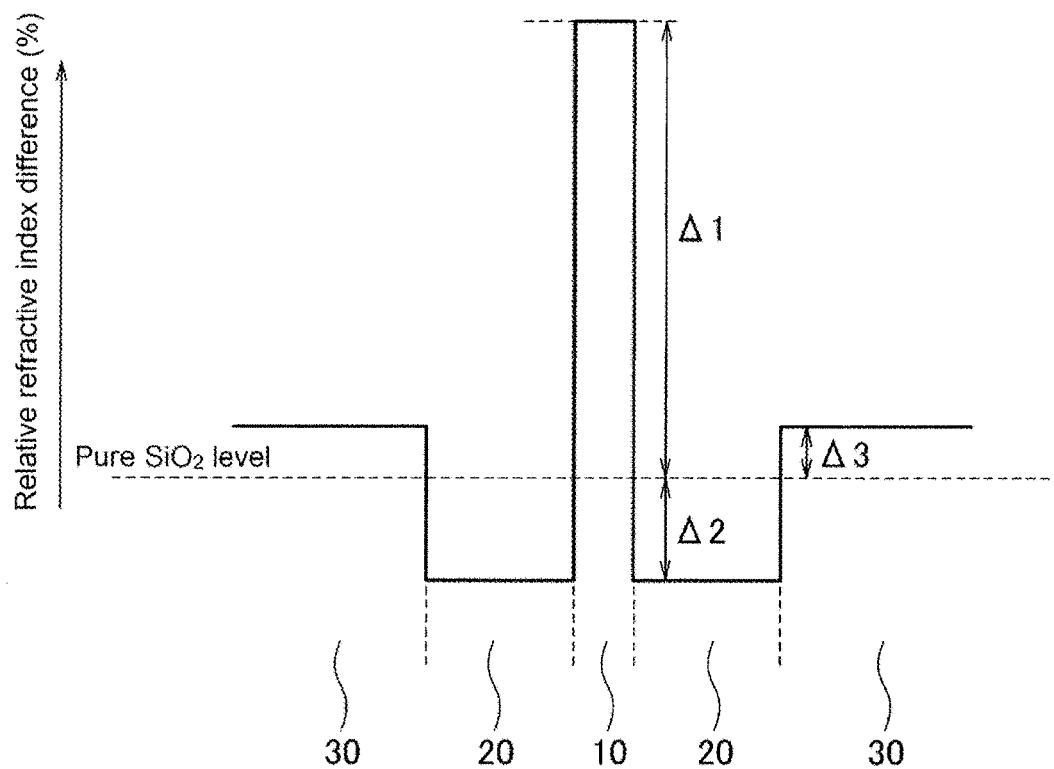
FIG. 3 is a schematic diagram showing a refractive index profile of the glass part of the optical fiber of FIG. 1.

FIG. 3 is a schematic diagram typically showing the refractive index profile of the glass part 1. The relative refractive index difference shown on the ordinate is based on the refractive index of pure $SiO_2$, and defined by expressing the refractive-index difference in terms of percentage (%) with respect to pure $SiO_2$. This optical fiber exhibits a relationship of $\Delta 1 > \Delta 3 \geq \Delta 2$, where $\Delta 1$ is the relative refractive index difference of the center core region 10, $\Delta 2$ is the relative refractive index difference of the optical cladding layer 20, and $\Delta 3$ is the relative refractive index difference of the jacket layer 30.

Figure 4:
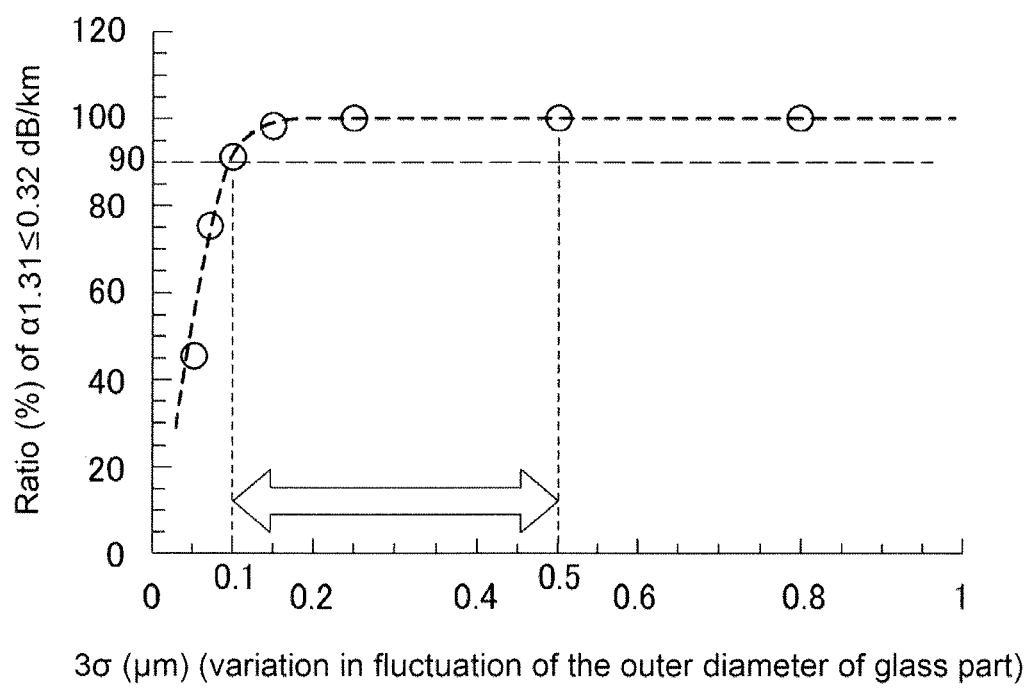
FIG. 4 is a graph showing the relationship between the attenuation at 1.31 μm and the variation in fluctuation of the outer diameter of a glass part.

FIG. 4 is a graph showing the relationship between the attenuation at 1.31 μm and the variation in the fluctuation of the outer diameter of the glass part 1. Here, when the attenuation $\alpha(\lambda)$ (dB/km) of an optical fiber at a wavelength $\lambda$ is approximated by the formula:

$$\alpha(\lambda) = A/\lambda^4 + B + C(\lambda),$$

the first term, $A/\lambda^4$ (dB/km), of the formula shows the Rayleigh scattering loss, which is caused by density fluctuation in the optical fiber. The coefficient A of the first term (henceforth, value A) is called Rayleigh scattering loss coefficient (dB/(km·μm$^4$)), and the attenuation of the optical fiber is reduced as a whole by lowering the value A. The second term B of this formula, which shows a loss due to the structural disorder of the optical fiber, is a component independent of the wavelength $\lambda$. The third term $C(\lambda)$ of this formula shows other losses, such as OH absorption and infrared absorption on the long wavelength side.

In FIG. 4, the ordinate shows ratios of fibers (percentage in length) of low attenuation fibers in which the attenuation $\alpha_{1.31}$ was 0.32 dB/km or less at the wavelength of 1.31 μm (1310 nm), that is, the index for defining the low attenuation fiber at the wavelength obtained from the measurement on 10,000 km optical fibers. Here, a horizontal dashed line is drawn at the level of 90% for indicating an acceptability criterion of not less than 90% as mass-production of optical fibers.

On the other hand, the abscissa of FIG. 4 shows the value of 3σ, where σ expresses the standard deviation of the outer diameter of the glass part 1 in the case where the outer diameter of the glass part 1 is measured at intervals of 1 m with respect to the fiber length of 10 km. Here, the range in which 3σ is from 0.1 μm to 0.5 μm is shown by two vertical dashed lines and the arrow between them.

The lower limit of 0.1 μm of the above-mentioned 3σ is set as the minimum within the range of 3σ in which $\alpha_{1.31} \leq 0.32$ dB/km is 90% or more. The upper limit 0.5 μm in the above-mentioned range is set as the maximum within the range where $\alpha_{1.31} \leq 0.32$ dB/km is 90% or more and the requirement of the international communication standard (ITU-T), that is, the outer diameter of the glass part 1 must be within the range of 125±1 μm, is satisfied substantially (99% or more), when the average value is set to 125±0.5 μm in an actual production.

At a drawing process in the manufacture of an optical fiber, the structural disorder (density fluctuation) of glass will decrease if the optical fiber is slowly cooled from a high temperature state so that the glass constituting the fiber may be put in a state closer to a low-temperature thermal equilibrium by promoting the structural relaxation. However, in such case, the fluctuation in the outer diameter of the glass part 1 will be larger. As described above, the Rayleigh scattering loss is caused by density fluctuation in an optical fiber, and the smaller the value A, the larger the fluctuation in outer diameter of the glass part 1 will be.

As mentioned above, in the optical fiber in which Ge is added to the core, if 3σ (σ is the standard deviation in the longitudinal direction of the outer diameter of the glass part 1) is in the range of 0.1 μm to 0.5 μm, it is possible to obtain a low attenuation optical fiber in which the attenuation at the wavelength of 1310 nm is 0.32 dB/km or less and the outer diameter of the glass part 1 satisfies the requirement of the international standard.

In an optical fiber in which Ge is added to the core, it is preferable that $\Delta 1$ be in the range of 0.15% to 0.35% and $\Delta 2$ be in the range of −0.15% to 0.00% in the case where the jacket layer 30 is pure silica glass or no dopants other than Cl are added. The lower limit of $\Delta 2$, that is −0.15%, is set on the basis of the limit that can be achieved by doping the cladding layer 20 with fluoride, using $CF_4$ (carbon tetrafluoride) as a material.

In the optical fiber in which Ge is added to the core, it is preferable that $\Delta 3$ be in the range of −0.05% to −0.05% in the case where the jacket layer 30 is made of silica glass which does not contain any dopants other than fluoride. Furthermore, in the optical fiber in which Ge is added to the core, it is preferable that the fictive temperature be 1620° C. or less. Here, the fictive temperature is a temperature of a super-cooled liquid the structure of which corresponds to the structure frozen in the glass and it can be an index for indicating the extent of structural relaxation in the glass. That is, it expresses the uniformity of glass structure, and the higher the fictive temperature, the larger the density fluctuation is. By promoting the structure relaxation, the Rayleigh scattering loss within the optical fiber decreases and the attenuation can be reduced.

Figure 5:
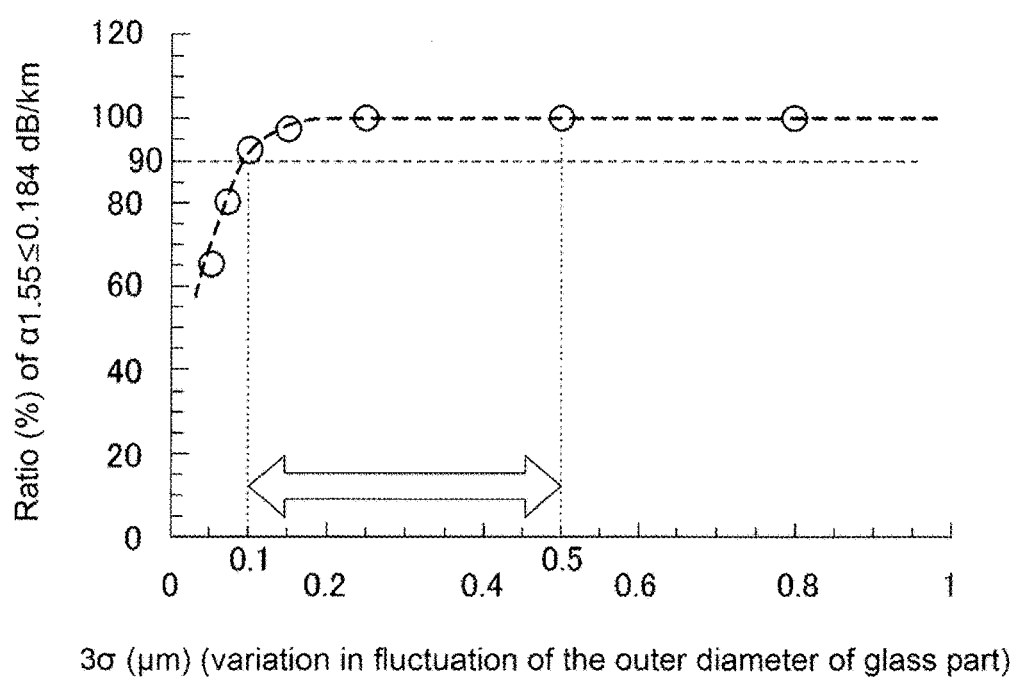
FIG. 5 is a graph showing the relation between the attenuation at 1.55 μm and the variation in fluctuation of the outer diameter of a glass part.

FIG. 5 is a graph showing the relationship between the attenuation at 1.55 μm and the variation of fluctuation with respect to the outer diameter of the glass part 1. The ordinate and abscissas of FIG. 5 are the same as those of FIG. 4. As described above, the reduction in the value A affects the total wavelength. Therefore, if 3σ is 0.1 or more and 0.5 or less, it is possible to obtain an optical fiber in which the attenuation $\alpha_{1.55}$ at the wavelength of 1.55 μm is 0.184 dB/km or less (i.e., an index for a low attenuation fiber at this wavelength), and in which the outer diameter of the glass part 1 satisfies the requirement of the international standard.

It is preferable that the outer diameter of the colored layer be 180 μm or more and 210 μm or less in a colored optical fiber which has two ultraviolet-curing protective covering layers 40 and 50 coated around the perimeter of the glass part 1 including the core doped with Ge and which has a colored layer 60 for identification. In a colored optical fiber having an outer diameter of about 200 μm by providing a thin coating, the micro bending loss is high as compared with the conventional colored optical fiber including a colored layer and having an outer diameter of about 250 μm. However, as compared with the conventional colored optical fibers, the optical fiber according to the embodiment of the present invention has a lower Rayleigh scattering loss and an equivalent attenuation, so that it is capable of actual use. Therefore, it is possible to put the colored optical fibers of the present invention in a cable more than the conventional colored optical fibers.

As described above, according to the embodiments of the present invention, regarding an optical fiber made of silica glass and including: a center core region doped with Ge; an optical cladding layer formed around the perimeter of the center core region; and a jacket layer formed around the perimeter of the optical cladding layer, it is possible to provide a low attenuation optical fiber and colored optical fiber, in which the Rayleigh scattering loss is lessened by controlling variation in fluctuation of the outer diameter of the glass part 1 within a given range while the relative refractive index differences of the center core region, the optical cladding layer, and the jacket layer are respectively maintained within the predetermined relationships with respect to pure silica glass.

What is claimed is:

1. An optical fiber comprising:
    a glass part made of silica glass and having a first outer diameter; and
    a covering part around the glass part,
    the glass part including:
    a center core region containing Ge and having a relative refractive index difference Δ1 with respect to pure silica glass;
    an optical cladding layer provided around the center core region, containing fluorine, and having a relative refractive index difference Δ2 with respect to the pure silica glass; and
    a jacket layer provided around the optical cladding layer and having a relative refractive index difference Δ3 with respect to the pure silica glass, wherein
    the relative refractive index differences have a relationship of Δ1>Δ3≥Δ2, an average of the first outer diameter along the longitudinal direction being in the range of 125±0.5 μm, and 3σ being in the range of 0.1 μm to 0.5 μM, where σ is a standard deviation of the first outer diameter along the longitudinal direction.

2. An optical fiber according to claim 1, wherein the relative refractive index difference Δ1 is in the range of 0.15% to 0.35% and the relative refractive index difference Δ2 is in the range of −0.15% to 0.00%.

3. An optical fiber according to claim 1, wherein the relative refractive index difference Δ3 is in the range of −0.05% to 0.05%.

4. An optical fiber according to claim 1, wherein the glass part has a fictive temperature of 1620° C. or less.

5. A colored optical fiber including an optical fiber as set forth in claim 1, wherein
    the covering part consists of two protective covering layers and an identification colored layer is provided around the covering part, the colored layer having a second outer diameter of 180 μm or more and 210 μm or less.

* * * * *